United States Patent [19]

DeLorean

[11] 4,391,340
[45] Jul. 5, 1983

[54] DITHER ASSISTED STEERING

[76] Inventor: John Z. DeLorean, 280 Park Ave., New York, N.Y. 10017

[21] Appl. No.: 231,399

[22] Filed: Feb. 4, 1981

[51] Int. Cl.³ .............................................. B62D 3/00
[52] U.S. Cl. ........................................ 180/79; 74/61; 74/498
[58] Field of Search ................. 180/79, 79.3, 89, 141; 74/61, 498

[56] References Cited

U.S. PATENT DOCUMENTS

| | | | |
|---|---|---|---|
| 2,021,706 | 11/1935 | Twyman | 180/79.1 |
| 2,075,288 | 3/1937 | Jay | 280/87 |
| 2,078,596 | 4/1937 | Barr et al. | 180/79 |
| 2,142,266 | 1/1939 | Drachenberg et al. | 180/79.3 |
| 2,143,183 | 1/1939 | Barr | 180/1 |
| 2,833,154 | 5/1958 | Barnes et al. | 74/388 |
| 2,906,355 | 9/1959 | Hirsch | 180/1 |
| 2,967,980 | 1/1961 | Ovshinsky | 317/123 |
| 2,978,058 | 4/1961 | Orr | 180/79.3 |
| 2,987,132 | 6/1961 | Reiter | 180/1 |
| 3,191,109 | 6/1965 | Hepner | 318/2 |
| 3,351,152 | 11/1967 | Turible | 180/79.1 |
| 3,458,006 | 7/1969 | Bettega | 180/79.3 |
| 3,837,231 | 9/1974 | Holmlund | 74/61 |
| 3,983,953 | 10/1976 | Bayle | 180/79.1 |
| 4,050,527 | 9/1977 | Lebelle | 74/61 |

Primary Examiner—David M. Mitchell
Assistant Examiner—Ross Weaver
Attorney, Agent, or Firm—Kenyon & Kenyon

[57] ABSTRACT

In order to reduce steering effort in an automobile at low speeds, without excessive power consumption, a low amplitude dither is introduced into the steering linkage to break away the friction between the tires and road surface.

12 Claims, 6 Drawing Figures

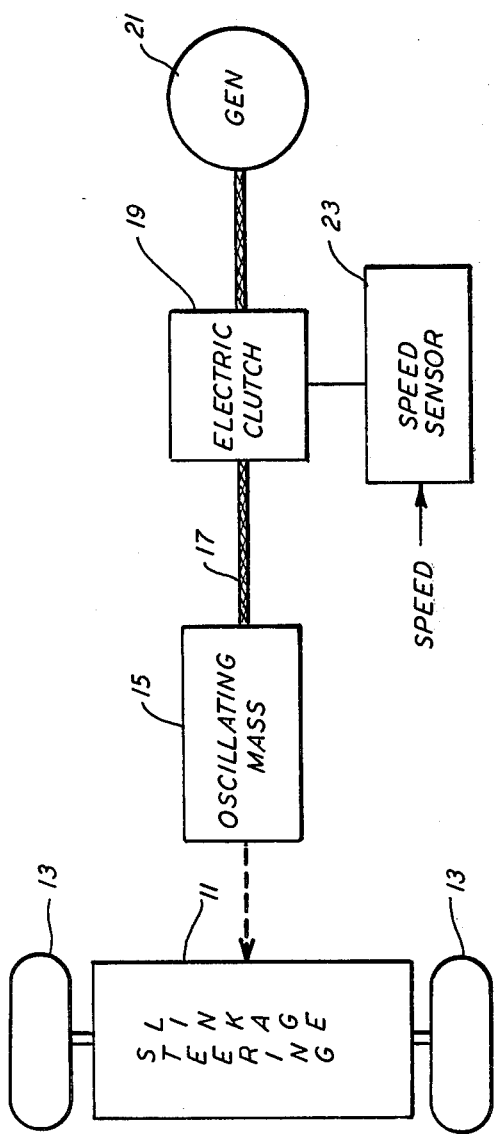
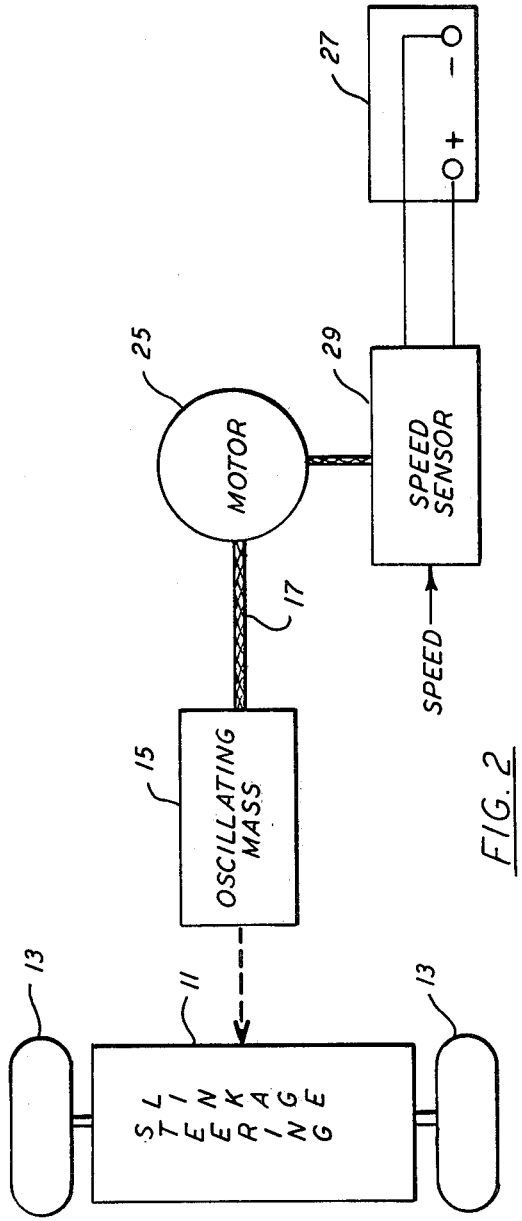

DITHER ASSISTED STEERING

BACKGROUND OF THE INVENTION

This invention relates to automotive steering systems in general and more particularly to a method and apparatus for reducing the effort required to steer an automobile at low speeds.

Assists for steering systems in automobiles are well known and, in the large automobiles produced by the United States auto makers in the past, came to be almost standard equipment. Although various types of assist systems were developed over the years, a hydraulic system was generally adopted in the industry. The hydraulic system used is one which operates whenever the engine is running although it is most useful in parking and at low speeds. The increased difficulty in steering at low speeds, such as when parking, comes about because of an increase in the friction between the road surface and the tire and because the wheels must be turned through a much larger angle than when operating on the road at higher speeds. Despite its convenience and popularity, power assisted steering is expensive to operate. In other words, it reduces gasoline mileage. In the past when gasoline supplies were plentiful and gasoline was inexpensive, this did not constitute a major problem. However, with increasing gasoline prices and with the tendency toward smaller cars, the inclusion of the conventional type power steering in such cars can be quite detrimental in the overall gasoline mileage. Furthermore, automobile makers, in order to achieve better mileage, are using smaller engines. The power required for power steering is taken from the engine and, if power steering of the conventional hydraulic type is to be used, a larger engine than might otherwise be required may need to be installed in the automobile, further reducing mileage.

Although the problem of steering a smaller car at low speeds and when parking is not as great as that with larger cars of the past, there is still a great deal of effort required by the driver in some instances. This can be a problem for less muscular drivers. It is thus apparent that a need exists for a steering assist system which does not consume large amounts of power, i.e., an assist system which will not appreciably decrease gasoline mileage and will not require a larger engine.

SUMMARY OF THE INVENTION

The present invention fulfills this need through a system which assists steering but does so with a minimum energy requirement. In accordance with the present invention, an oscillating structure is attached to the steering linkage at an appropriate point and introduces into the linkage an oscillation or dither which is transmitted to the wheels. The dither results in a continual small amplitude movement of the wheels on the pavement and overcomes static friction, the basis of the problem which required steering assistance in the first instance.

What is occurring can easily be understood if one considers the different degrees of effort required to turn the steering wheel on an automobile when it is standing still or when it is moving. Without power assisted steering, when an automobile is standing still it obviously becomes very difficult to turn the wheel. However, as soon as the wheel begins to roll on the pavement the amount of effort decreases materially. The dither introduced on the wheels has a similar effect and thus results in a reduced effort for steering at low speeds and when parking.

Any of a number of different systems can be used to introduce the dither. In general, the system will include one or more masses to which energy is added to cause an oscillation. An imbalance is established in the mass so as to introduce an oscillation or a dither into the steering linkage. Because one is dealing with an oscillating system with mass and inertia, only energy losses must be made up. Thus, once the oscillation is started, only a minimum amount of energy need be added. Analogously, one can consider the type of clock which has become popular recently in which a pendulum operates the clock with energy added to the pendulum by a battery. Clocks of this nature can operate for a number of years on a single dry cell battery since the oscillating system i.e., the pendulum, stores energy and only losses in the system such as friction losses must be made up by the energy source. Similarly, in the device of the present invention once oscillation commences there is a conservation of the imparted energy and only the friction and other losses in the system need be made up. Furthermore, the greatest energy use is in breaking away, i.e., overcoming static friction, in the first instance. Once this occurs, only sliding and rolling friction must be overcome; these are of much lower magnitude and therefore require less energy to overcome. In addition, selection of a frequency which permits easy introduction of energy is desirable. This generally calls for a lower frequency. Preferably the frequency will be tuned to a natural resonance frequency of the steering system.

A number of different manners of driving the oscillating mass are illustrated. In one embodiment, an electric motor is utilized. In another, a flexible coupling to the generator is employed. Essentially, one may use any of the various available sources of power associated with an automobile engine, such as a coupling to the engine either directly or indirectly by coupling to a device such as the generator which is coupled to the engine via a belt, or by coupling to an electric motor driven by electricity generated by the engine, or possibly the use of engine vacuum or a hydraulic system driven by an appropriate belt from the engine. In the last, i.e., hydraulic system, it must be noted that the amount of power required by such a hydraulic system is materially less than that required in presently used hydraulic power assist steering systems.

One may also use an auxiliary source of power such as a small internal combustion engine which can also be used to drive the fan, the alternator and accessories such as an air conditioner. In a third embodiment, such an auxiliary internal combustion engine is utilized with a flexible coupling from the engine to the oscillating mass.

Furthermore, it is desirable, at least in some cases, that the assist come into play only at low speeds. This can be accomplished in any number of ways. For example, if an electric motor is used to drive the oscillating mass it is simply necessary to turn off the motor. In the case of a drive through a flexible cable to the generator, for example, or to an auxiliary engine, an electrically operated clutch may be used. In either case, a control signal can be derived from a speed detector coupled to the speedometer, for example. Such speed detection, particularly in newer automobiles which utilize microprocessors for their control functions, presents no difficulty. If electronic processing of speed is available, an output from the processor used with the automobile can be provided for this purpose. Otherwise, a simple detector interposed into the speedometer system may be utilized.

Preferably, the dither is introduced into the linkage at a point as remote as possible from the driver so as not to imposed on the steering wheel a dither which would be annoying to the driver. This is one reason why it is desirable to operate the dither only at low speeds. Furthermore, in view of the other limitations on frequency noted above, a frequency should be selected which is the least annoying to the driver to the extent that it does travel up the steering system.

BRIEF DESCRIPTION OF THE DRAWINGS

FIG. 1 is a block diagram of a first system for for implementing the present invention.

FIG. 2 is a block diagram of a second system for implementing the present invention.

DETAILED DESCRIPTION OF THE INVENTION

Figure 3:
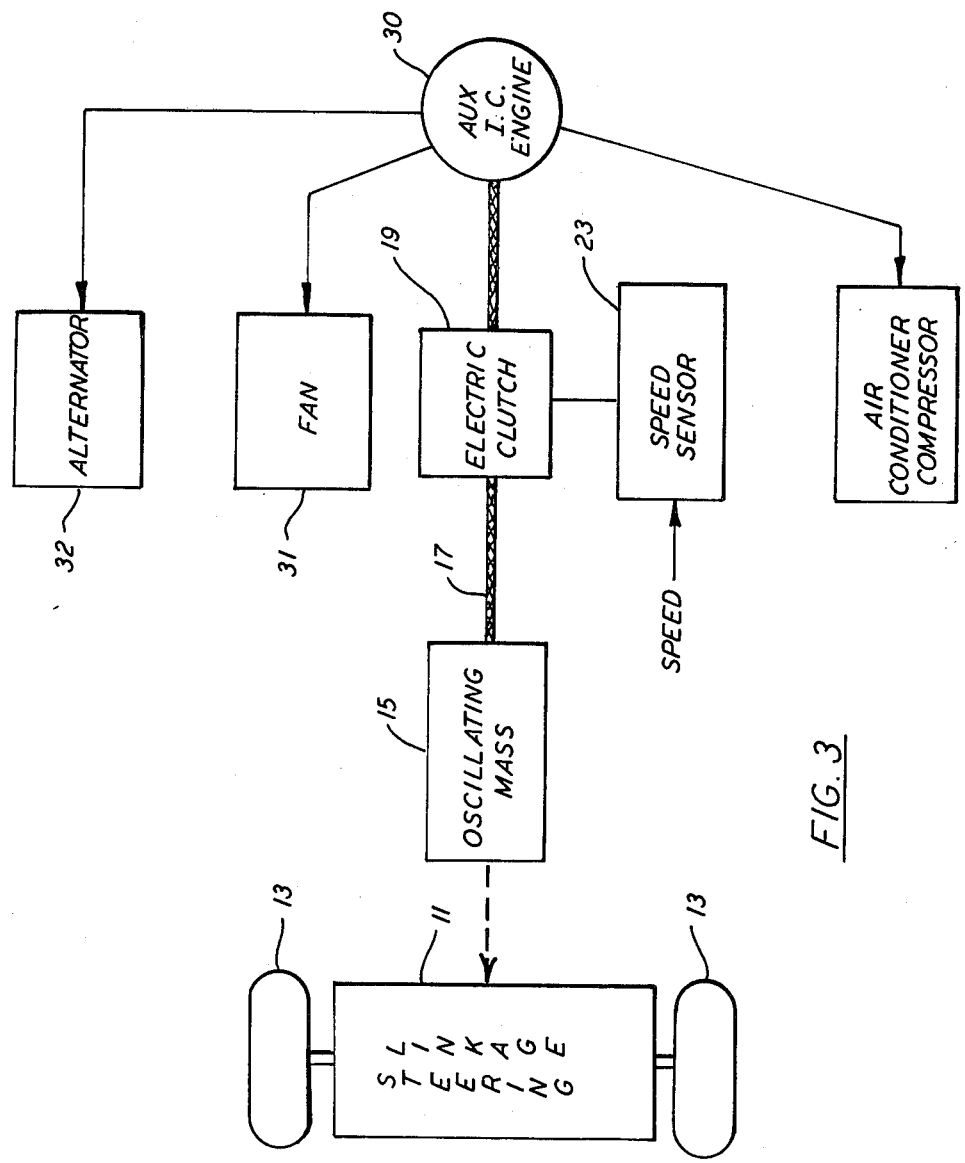
FIG. 3 is a block diagram of a third system for implementing the present invention.

FIG. 1 illustrates a first embodiment of the present invention. The present invention requires means for applying or introducing dither into the steering linkage, a power source, and means for coupling power into the means applying the dither. In the embodiment of FIG. 1, means for generating or imparting dither to a steering linkage 11 which is coupled to wheels 13 in the form of an oscillating system 15 is provided. The oscillating mass, in the illustrated embodiment, is driven by a flexible cable 17 which is coupled through an electric clutch 19 to the generator 21. In conventional fashion, the generator 21 is assumed to be coupled to the engine by means of an appropriate belt. If necessary, a reduction gear can be included in the drive train. The electric clutch 19 is not necessary if the dither is to be maintained at all speeds. However, in the illustrated embodiment, a speed sensor 23 is provided which receives an input from a speed measuring device such as a speedometer, be it mechanical or electronic, and which is responsive to operate the electric clutch to connect and disconnect the oscillating mass 15 from the generator 21 at a predetermined speed. As indicated previously, it is desired always to have the oscillation at low speeds, e.g., below 15 miles per hour, but such oscillations are not needed at higher speeds.

Another embodiment of the present invention is illustrated in FIG. 2. In this Figure, the steering linkage, wheels and oscillating system 15 are as before. However, in this case power is supplied to the oscillating system from an electric motor 25, again over a flexible cable 17. The motor receives power from the automobile battery 27 through speed sensor 29 which includes a switch for selectively making the connection between the motor 25 and battery 27. Again, speed sensor 29 has a speed input and below a certain speed will turn on the motor 25 and above that speed turn it off. Again, the speed sensor can be dispensed with and the motor operated at all times.

In the embodiment illustrated in FIG. 3, the oscillating mass 15 is driven by a flexible cable 17, which is coupled through an electric clutch 19, as in the embodiment of FIG.1. However, the clutch 19 is coupled to a samll auxiliary internal combustion engine 30 rather than to a generator via the flexible cable. As in the FIG. 1 embodiment, a speed sensor 23 is provided to operate the electric clutch to connect and disconnect the oscillating mass to the auxiliary engine at a predetermined speed. The auxiliary engine is preferably a constant speed engine and may also drive the fan 31, alternator 32, and air conditioner compressor 33 as illustrated in block form in FIG. 3.

Figure 4:
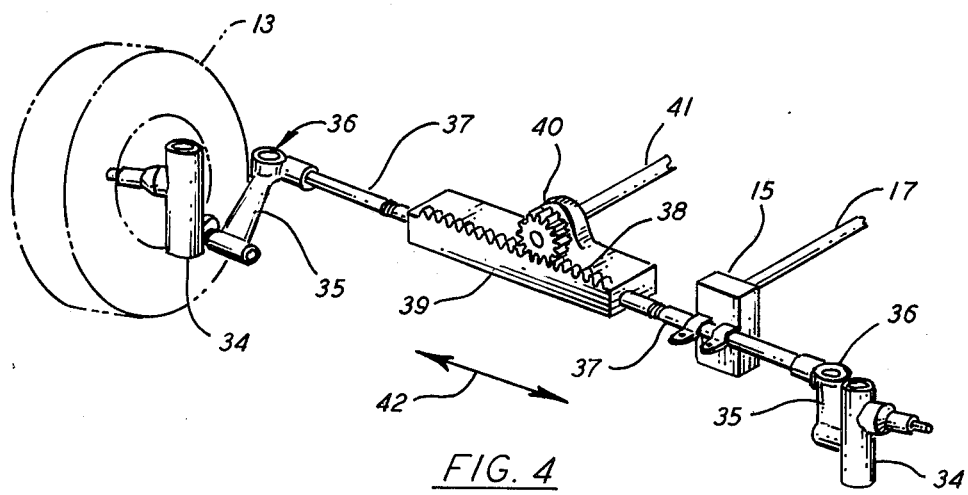
FIG. 4 is a schematic diagram illustrating the application of the present invention to a rack and pinion steering system.

FIG. 4 shows the attachment of an oscillating system 15 to a rack and pinion steering linkage. The wheels 13 are shown along with the steering knuckle and wheel spindle units 34 which are coupled through knuckle arms 35 and conventional ball joints 36 to tie rods 37 coupled in turn to the rack 38 of the rack and pinion steering mechanism within the gear box 39. Within the gear box 39 the rack 38 is driven by a pinion 40 on the end of the steering column 41. As illustrated, the oscillating system 15 is coupled to the tie rod 37. It is a vibrating system adapted to place, on the tie rod, a dither going back and forth in the direction of arrow 42. This dither will be transmitted to the wheels 13 to break away the static friction on the pavement to ease steering. A rack and pinion system is shown by way of example. The present invention is equally applicable to other systems such as a worm and roller type, Ross arm and twin lever, recirculating ball-and-nut, etc. It is only necessary that the oscillating system be coupled into the linkage at a point where the dither will be transmitted to both wheels.

Figure 5:
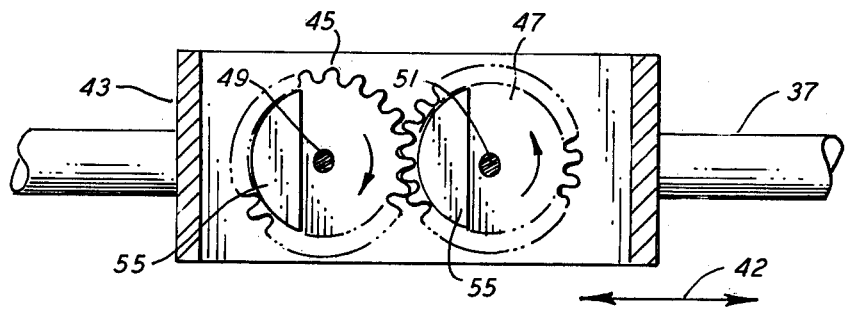
FIG. 5 is an elevation view of an oscillating mass system which can be used with the present invention.
Figure 6:
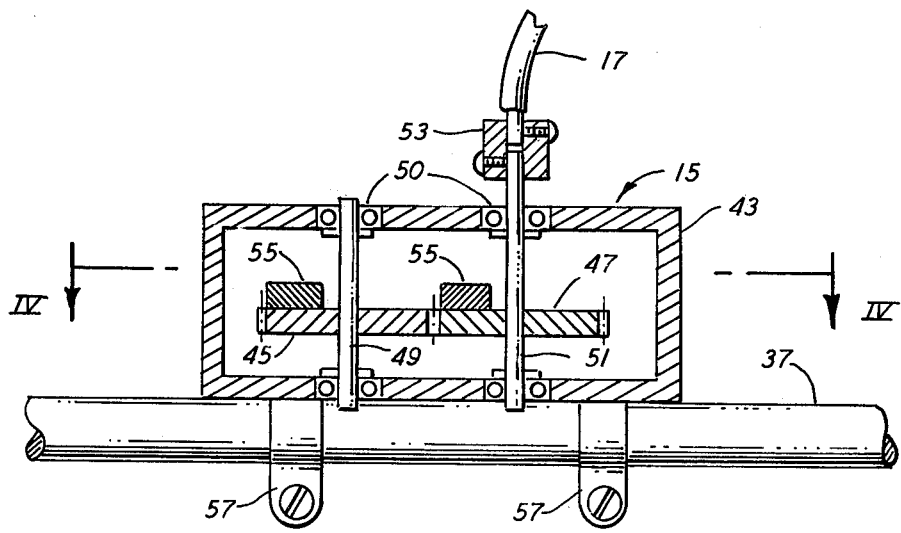
FIG. 6 is a plan view of the oscillating mass system of FIG. 5.

FIGS. 5 and 6 are elevation and plan views respectively of one type of mechanism which can be used as the oscillating system 15. As illustrated, the oscillating system 15 includes a frame or casing 43. Within casing 43, engaging gears 45 and 47 are secured on shafts 49 and 51 respectively. Both shafts are journaled in appropriate bearings 50 in casing 43. Shaft 51 extends completely through the casing 43 and has attached to the end thereof a coupling 53 by means of which it couples the shaft to the flexible cable 17 which in turn is connected to the motive force, e.g., to the generator, motor or auxiliary engine shown in FIGS. 1-3, respectively. Each of the gears 45 and 47 contains thereon an eccentric weight 55. Frame 43 is clamped to the tie rod 37 by means of a pair of clamps 57. It should be evident that, as the gears 45 and 47 rotate, the masses of the weights 55 will result in force components alternately to the left and right as indicated again by the doubled ended arrow 42. This back and forth motion or vibration will be imposed on the tie rod 37. Although a single rotating weight could accomplish the necessary vibration, a pair are used in the present system, the pair counter rotating as indicated by the arrows on FIG. 5. This tends to cancel oscillations in a direction perpendicular to arrow 42. Preferably, the vibrations will be tuned to the mechanical system resonance of the steering system in order to minimize energy input needed to achieve vibrations. For this reason, the exact frequency best suited will depend on the steering system with which the present invention is used, along with the other considerations noted above.

As noted previously, in general, any driving force may be used. Coupling to the vibrating system 43 of FIGS. 5 and 6 may be through the flexible cable 17 illustrated or, alternatively, could be by means of a pulley and belt or could be a direct connection. For example, an electric motor could be directly connected to the frame 43 with the gear 47 secured on the shaft of the electric motor, i.e., shaft 51 would be the motor shaft. Furthermore, it should be noted that the system is one which can be easily added on to existing steering systems. One need only clamp it on using the clamps 57 shown in FIG. 6. These and other modifications can be made without departing from the spirit of the invention which is intended to be limited solely by the appended claims.

I claim:

1. A method of reducing steering effort at low speeds in a mechanical steering system in an automobile, including a steering linkage coupling a steering wheel to wheels having tires thereon, comprising introducing into the steering linkage a low amplitude dither so as to break away the friction normally existing between tire and roadway.

2. The method of claim 1 and further comprising selecting the frequency of said dither to be equal to a natural resonant frequency of the steering system.

3. In combination with a steering system linkage coupling a steering wheel to wheels having tires thereon, apparatus for reducing steering effort at low speeds by introducing a low amplitude dither into the steering linkage, comprising:
    (a) means including an oscillating system attached to the steering linkage; and
    (b) means to input energy to said oscillating system.

4. Apparatus according to claim 3 wherein said oscillating system comprises an oscillating mass.

5. Apparatus according to claim 4 wherein said oscillating system comprises:
    (a) a frame;
    (b) first and second gears engaging each other supported for rotation in said frame; and
    (c) an eccentric weight disposed on each of said gears.

6. Apparatus according to claim 3 wherein said means for coupling energy comprises an electric motor.

7. Apparatus according to claim 3 and wherein said means for coupling energy comprises means to couple said system to a rotating component in the automobile in which the steering linkage is to be installed.

8. Apparatus according to claim 3, wherein said means for coupling energy comprises an auxiliary internal combustion engine.

9. Apparatus according to claim 3 wherein said means for coupling comprises a flexible cable adapted to be disposed between said oscillating system and said rotating component.

10. Apparatus according to claim 3 and further including means operable to cause said means for coupling energy to couple energy to said vibrating system only at low vehicle speeds.

11. Apparatus according to claim 10 wherein said means to cause comprises a speed sensor and means to interrupt the supply of energy when a vehicle speed above a predetermined amount is sensed.

12. Apparatus according to claim 3 and further including means to attach said oscillating system to the steering linkage whereby said system may be added on to existing automobiles.

* * * * *